United States Patent
Hayes

(10) Patent No.: US 6,724,947 B1
(45) Date of Patent: Apr. 20, 2004

(54) METHOD AND SYSTEM FOR MEASURING CHARACTERISTICS OF CURVED FEATURES

(75) Inventor: Timothy S. Hayes, Hingesburg, VT (US)

(73) Assignee: International Business Machines Corporation, Armonk, NY (US)

( * ) Notice: Subject to any disclaimer, the term of this patent is extended or adjusted under 35 U.S.C. 154(b) by 670 days.

(21) Appl. No.: 09/616,862

(22) Filed: Jul. 14, 2000

(51) Int. Cl.$^7$ ................................................. G06K 9/36
(52) U.S. Cl. ...................................... 382/286; 382/145
(58) Field of Search ................................. 382/144, 145, 382/286, 141, 203, 204; 345/442; 348/135, 180, 87

(56) References Cited

U.S. PATENT DOCUMENTS

| | | | |
|---|---|---|---|
| 3,626,195 A | | 12/1971 | Fitzjohn et al. |
| 3,643,101 A | | 2/1972 | Shipp et al. |
| 3,761,182 A | | 9/1973 | Kubisiak et al. |
| 3,873,211 A | | 3/1975 | Warson |
| 3,897,156 A | | 7/1975 | Chasson |
| 4,339,799 A | * | 7/1982 | Abele et al. ................... 378/11 |
| 4,555,798 A | | 11/1985 | Broadbent, Jr. et al. |
| 4,687,328 A | | 8/1987 | Shiraishi et al. |
| 5,283,628 A | | 2/1994 | Dotson et al. |
| 5,291,273 A | | 3/1994 | Gelbart |
| RE35,816 E | | 6/1998 | Schulz |
| 5,898,797 A | * | 4/1999 | Weiss et al. ................. 382/199 |
| 5,959,325 A | | 9/1999 | Adair et al. |
| 5,991,427 A | * | 11/1999 | Kakinami et al. ........... 382/104 |
| 6,434,257 B1 | * | 8/2002 | Mohan et al. ............... 382/110 |

FOREIGN PATENT DOCUMENTS

| | | |
|---|---|---|
| JP | 63-21844 | 1/1988 |
| JP | 63-21845 | 1/1988 |
| JP | 5-29424 | 2/1993 |
| JP | 6-347246 | 12/1994 |
| JP | 8-114436 | 5/1996 |
| JP | 9-166607 | 6/1997 |

OTHER PUBLICATIONS

M. Graulich et al., "Precise Diameter Measurement of Contact Holes and Inspection of Resist Residuals", *IBM Technical Disclosure Bulletin*, vol. 37, No. 02B, p. 587, Feb. 1994.

J. D. Dietel et al., Making Asynchronous Communication Look the Same as Normal Method Calls, *IBM Technical Disclosure Bulletin*, vol. 37, No. 02B, p. 589, Feb. 1994.

* cited by examiner

*Primary Examiner*—Yon J. Couso
(74) *Attorney, Agent, or Firm*—Richard M. Kotulak; Cantor Colburn LLP

(57) ABSTRACT

An exemplary embodiment of the invention is a method and system for determining a radius of curvature of a two-dimensional curved feature. The system includes an image acquisition device for obtaining images of said curved feature. A processor is coupled to the image acquisition device for receiving the images and converting the images to n sets of coordinates corresponding to points on the perimeter of the curved feature. The processor chooses at least three sets of said coordinates to define at least one group and fits each set of said coordinates from each group to an equation for a circle and determines a radius of curvature by solving each equation simultaneously. A storage device is coupled to the processor for storing processor data. An output device is coupled to the processor for outputting processor data.

45 Claims, 10 Drawing Sheets

First Side
Group 1: (X1,Y1);(X3,Y2);(X5,Y3)
Group 2: (X3,Y2);(X5,Y3);(X7,Y4)

Second Side
Group 3: (X2,Y1);(X4,Y2);(X6,Y3)
Group 4: (X4,Y2);(X6,Y3);(X8,Y4)

METHOD AND SYSTEM FOR MEASURING CHARACTERISTICS OF CURVED FEATURES

BACKGROUND OF THE INVENTION

The invention relates generally to semiconductor fabrication and, more specifically, to a method and system for performing radius of curvature measurements on a two-dimensional curved feature to accurately determine the feature's diameter and circularity. Critical dimension scanning electron microscopes "CD-SEM" are often used to perform measurements on semiconductor features during fabrication (e.g. contact hole diameter, line widths, etc.). Numerous scans, typically 32 scans or 64 scans, of the feature are performed in the x direction and/or in the y direction. For contact holes, the largest x measurement and the largest y measurement are recorded as the assumed diameter. Comparison of these two assumed diameter measurements gives a limited indication of circularity.

For example, some CD-SEMs can measure the diameter of contact holes in both the y and x directions. The measurements represent the maximum space length of the series of scans that are rastored over the contact hole. This technique is suitable for contact holes that are highly circular and exhibit little edge roughness. A more accurate measurement is obtained by performing scans in the vertical and horizontal directions and averaging the diameters. The ratio of the two numbers can also give information about the circularity of the feature. However, the results are often inaccurate given a feature that is highly non-circular.

Due to typical irregularities on the edge of a feature such as a contact hole in a semiconductor device, this numerous scan approach often results in erroneous measurements. Further, numerous scans cause charging and/or contamination buildup on a feature's edge. This may cause the apparent feature size to change. Also, the practice of using the largest measurement as the assumed diameter will give an erroneous result if a feature is a non-circular contact hole. A more accurate method is desired.

BRIEF SUMMARY OF THE INVENTION

An exemplary embodiment of the invention is a method and system for determining a radius of curvature of a two-dimensional curved feature. The system includes an image/scan acquisition device for obtaining images/scans of said curved feature. A processor is coupled to the image/scan acquisition device for receiving the images and converting the images to n sets of coordinates corresponding to points on the perimeter of the curved feature. The processor chooses at least three sets of said coordinates to define at least one group and fits each set of said coordinates from each group to an equation for a circle and determines a radius of curvature by solving each equation simultaneously. A storage device is coupled to the processor for storing processor data. An output device is coupled to the processor for outputting processor data.

BRIEF DESCRIPTION OF THE DRAWINGS

Referring now to the drawings, wherein like elements are numbered alike in several FIGURES.

DETAILED DESCRIPTION OF THE INVENTION

In the present invention, the initial calculation gives a radius of curvature rather than a diameter. Using the radius of curvature data allows for a more accurate determination of the diameter and circularity of a curved feature such as a contact hole in a semiconductor device. Further application to the roundness of vertical and horizontal line intersects could also be sought.

This method is also useful in determining the length of a foreshortened line-type feature. Currently, lines, e.g. poly gate, can be measured for line width only because the line length exceeds the CD-SEM range. Foreshortening is known to occur however, and line width measurements must be used to estimate the level of foreshortening. Since foreshortening occurs as feature end rounding, the present invention can be used to determine the feature end's curvature which can then be correlated to how much the feature foreshortened and hence, its length.

The present invention can be applied to any image with known spatial reference, thus, making it suited for determining the radius of curvature, diameter and circularity of any curvilinear object. Ideal situations where this method could be employed are scanning electron and atomic force microscopy where prolonged imaging can damage materials, however, the method may be applied to any digital image with spacial reference.

Figure 1:
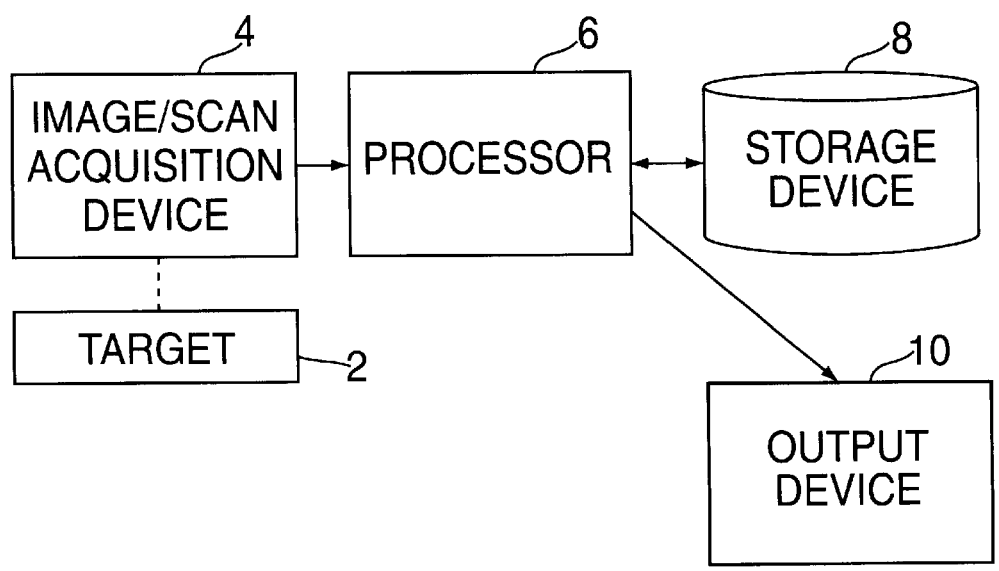
FIG. 1 is a block diagram of a system for determining a radius of curvature, diameter and circularity of a two-dimensional curved feature in one embodiment of the invention.

FIG. 1 is a block diagram of an exemplary system for determining the radius of curvature, diameter and circularity of a curved feature in one embodiment of the invention. A curved feature may be circular or non-circular. The system includes a target containing a two-dimensional curved feature, wherein the curved feature is scanned by an image/ scan acquisition device 4. The scanned images/scans are collected and transformed to sets of Cartesian coordinates by a processor 6. The processor 6 may be implemented using a general-purpose computer executing a computer program for carrying out the processes described herein. The processor 6 is coupled to a storage device 8 and an output device 10. The processor 6 executes software applications which may be implemented through computer programs. The computer programs may be stored on the processor 6 or may be stored on the storage device 8.

Figure 2:
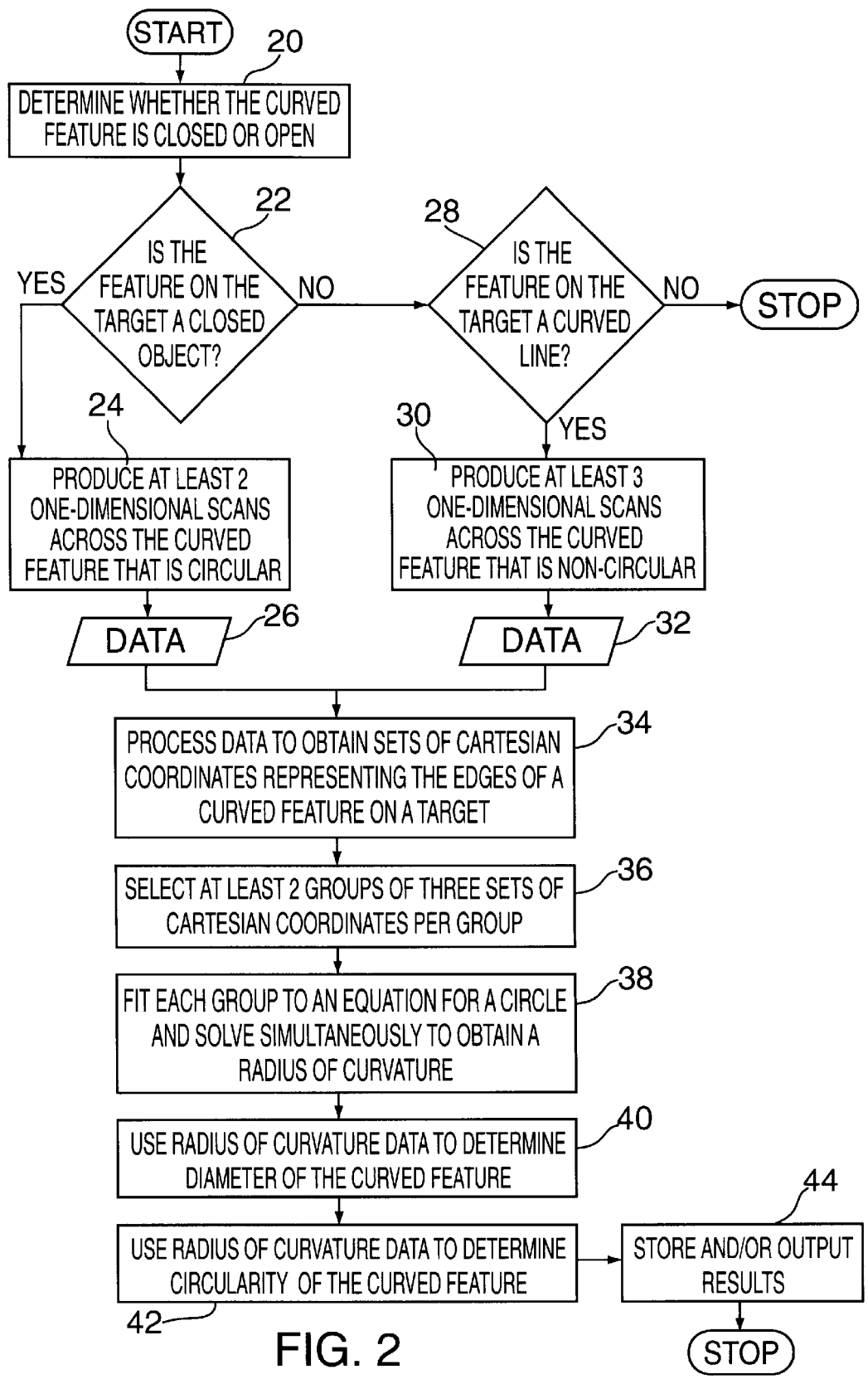
FIG. 2 illustrates an exemplary procedure for determining the radius of curvature, diameter and circularity of a two-dimensional curved feature.

FIG. 2 illustrates an exemplary procedure for determining the radius of curvature, diameter and circularity of two-dimensional curved features. In the preferred embodiment, a CD-SEM is used as the image acquisition device 4. In steps 20, 22, and 28, the curved feature is determined to be either circular or non-circular. Also in the preferred embodiment, steps 24 and 30 perform sixteen incremental one-dimensional scans across the curved feature. The data 26 and 32 is then processed in step 34 to obtain thirty two sets of Cartesian coordinates for a curved feature that is circular or sixteen sets for a curved feature that is non-circular.

Figure 3:
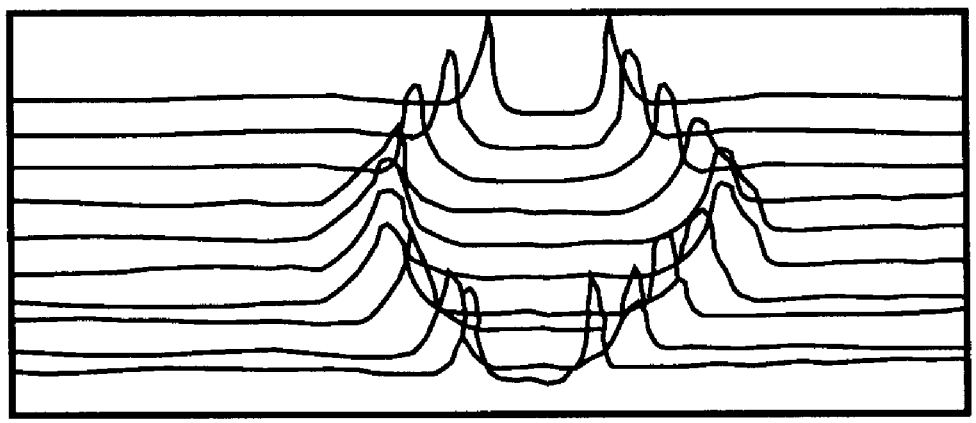
FIG. 3 depicts an exemplary schematic representation of the spatial reference of scans across a curved feature that is circular such as a contact hole in a semiconductor device.

For example, FIG. 3 depicts an exemplary schematic of waveforms generated from CD-SEM scans across a curved feature, such as a contact hole in a semiconductor device. The edges of the curved feature are represented by peaks in the waveforms. In step 34 the peaks of the waveforms are converted to sets of Cartesian coordinates by the processor 6. For example, the pixels of the scanned image correspond to (x,y) coordinates in plane space. The x-coordinate is obtained from the horizontal distance of a pixel of interest and the y-coordinate is determined from the line scan. The waveforms represent equidistant scans across the feature. Therefore, the vertical distance is a function of the scan height. The relationship between scan height, H and vertical distance, dvert is shown below:

$$d\text{vert}=H/n-1$$

where, n is the number of scans. One skilled in the art will appreciate that other methods may be substituted to determine the sets of Cartesian coordinates without departing from the spirit and scope of the present invention. Coordinate systems other than Cartesian may be used.

Figure 4:
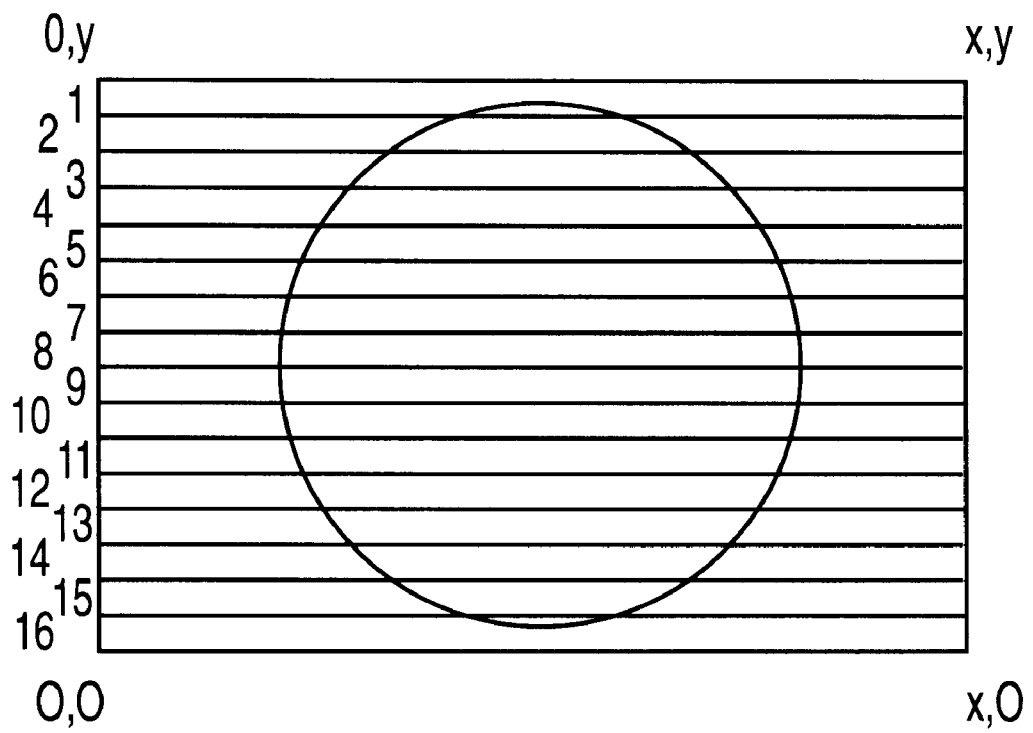
FIG. 4 depicts an exemplary schematic image of waveforms taken across a curved feature that is circular such as a contact hole in a semiconductor device, derived from a CD-SEM.
Figure 5:
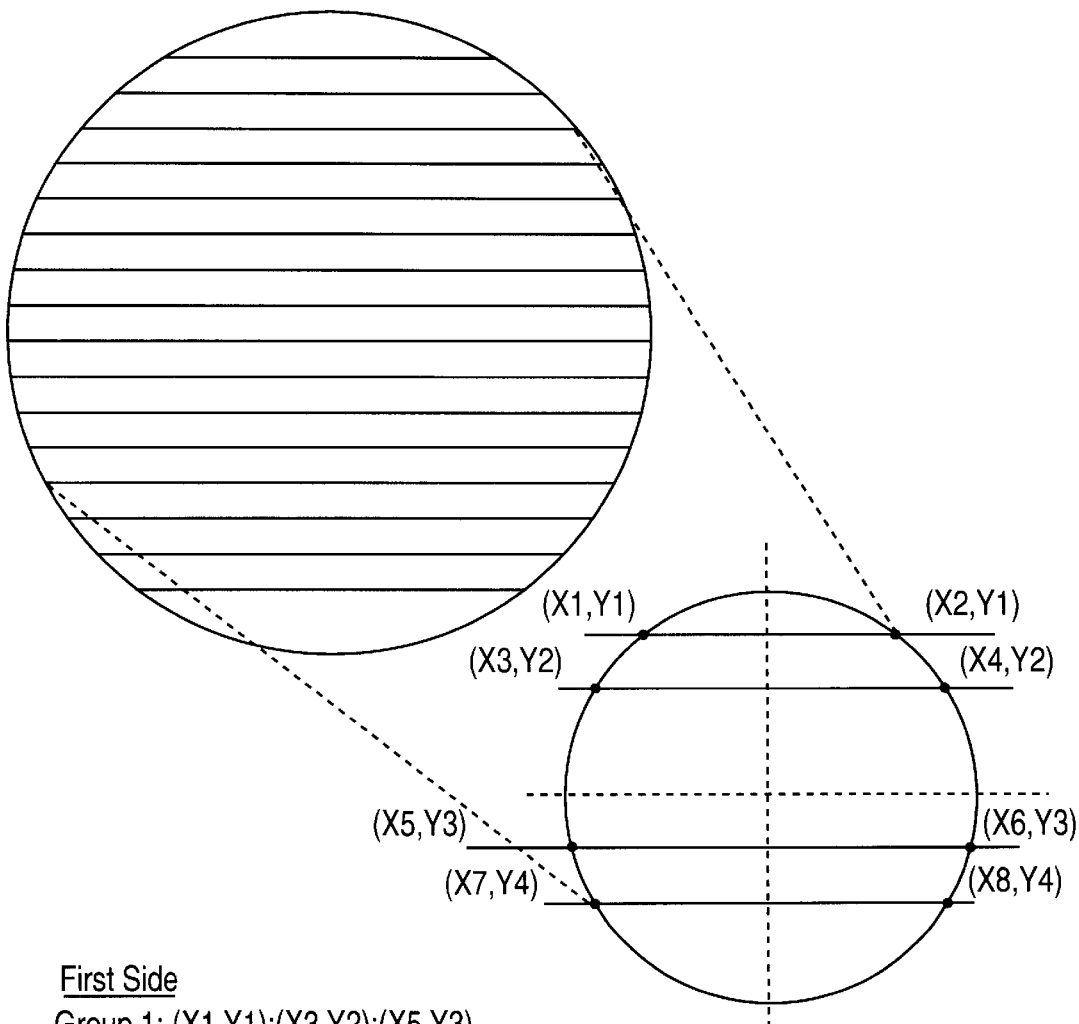
FIG. 5 is an exemplary schematic representation showing sixteen scans across a curved feature, four selected scans with the corresponding eight sets of Cartesian coordinates and four groups of Cartesian coordinates selected from the eight sets.

For a curved feature that is circular, such as a contact hole in a semiconductor device, the sixteen scans of the preferred embodiment are illustrated schematically in FIG. 4. Thirty two sets of Cartesian coordinates are obtained from the sixteen scans. In step 36, four of the sixteen scans are chosen, representing eight sets of Cartesian coordinates. The exact number of scans and subsequent groups of Cartesian coordinates is user defined. As part of step 36, four groups containing three sets of Cartesian coordinates per group are determined. As discussed later, three sets of Cartesian coordinates are required to determine a radius of curvature. For a curved feature that is a closed object (such as a circle or ellipse), two groups contain sets of Cartesian coordinates from a first side of the curved feature, and the other two groups contain sets of Cartesian coordinates from a second side. The first and second sides of the curved feature are defined by an imaginary line perpendicular to the scan containing the sets of Cartesian coordinates with the maximum spacial distance there between. The line divides the feature in two halves of approximately equal size. For example, FIG. 5 is a schematic showing the scans and sets of Cartesian coordinates chosen to obtain four sample groups, each group containing three sets of Cartesian coordinates.

As part of step 38, each group is fitted in the equation of a circle and solved simultaneously to obtain a radius of curvature. In other words, with three sets of Cartesian coordinates, three equations can be solved simultaneously, and the radius of curvature determined. The mathematical equation for a circle in Cartesian coordinates is given below:

$$(x-h)^2+(y-k)^2=R^2$$

Where the curved feature will have radius R, and a center of curvature located at the Cartesian coordinate given by (h, k). Each group yields one radius of curvature value. In other words, in the above example, four radius of curvatures are determined.

In steps 40 and 42, the radius of curvature data is used to determine the diameter and circularity of the curved feature. The diameter, D may be calculated as $$D=r\text{avg}\times 2$$

Where ravg is simply the average of the radius of curvature values.

Also, in step 42, the radius of curvature data is used to determine the circularity of the curved feature. First, the variance, V of each radius of curvature is determined.

$$V=|r-r\text{avg}|/r\text{avg}$$

Then, circularity, C is the average variance in the radius of curvature.

$$C=(V1+V2 \ldots Vn)/n$$

A perfect circle is represented by a value of zero for C. In another embodiment, wherein scans are taken in orthogonal directions, the oblateness or prolateness of oval contact holes can be determined by the ratio of horizontal to vertical V values. Finally, in step 44, the results are stored in the storage device 8 and/or exported to the output device 10.

As shown in the following tables, a sample circularity calculation is made on a hypothetical contact hole. In this example, step 36 involves selecting eight sets of Cartesian coordinates from scan lines 5, 7, 11 and 13. The sets of Cartesian coordinates are obtained in step 34 by the processor 6, and measured in nanometers. Table 1 illustrates eight sets of Cartesian coordinates of the hypothetical contact hole, as measured in nanometers. For this example, four radius of curvatures are determined: two for the left edge of the contact hole and two for the right edge. Table 2 shows the resulting radius of curvatures, deviation (r-ravg) and variance. The ravg is determined to be 163.8, with the circularity determined to be 4.13% non-circular (C=0.0413).

TABLE 1

| Line Scan | X-Left | X-Right | Y |
|---|---|---|---|
| 5 | 269.8 | 465.9 | 132.8 |
| 7 | 210.8 | 524.9 | 199.2 |
| 11 | 209.4 | 529.3 | 332 |
| 13 | 255.1 | 474.8 | 398.4 |

TABLE 2

| Line Scan | Edge | Radius of Curvature | Deviation (r-ravg) | Variance |
|---|---|---|---|---|
| 7 | Left | 158.58 | 5.22 | .0319 |
| 13 | Left | 177.26 | 13.46 | .0822 |

TABLE 2-continued

| Line Scan | Edge | Radius of Curvature | Deviation (r-ravg) | Variance |
|---|---|---|---|---|
| 11 | Right | 163.55 | 0.25 | .0015 |
| 5 | Right | 155.68 | 8.12 | .0496 |

Figure 6:
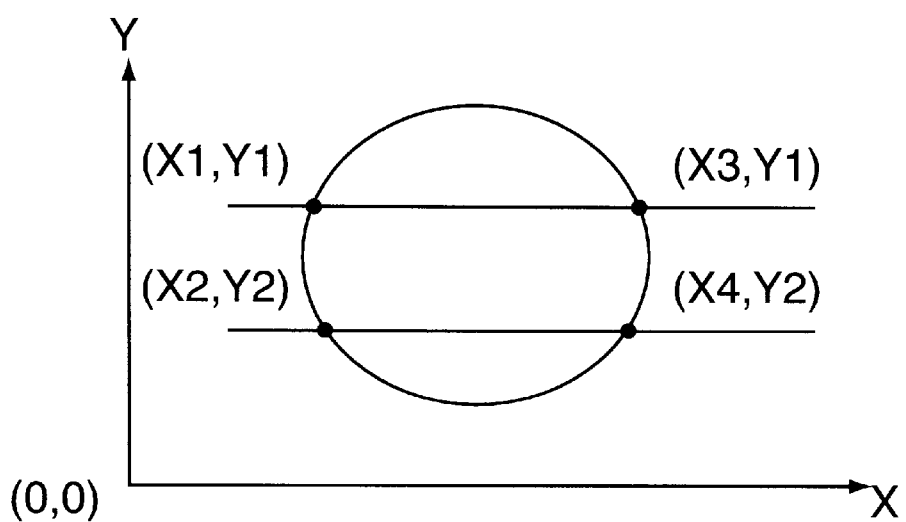
FIG. 6 is an exemplary schematic representation showing two scans across a curved feature that is circular, and the corresponding sets of Cartesian coordinates.

In another embodiment, step 24 performs only two incremental one-dimensional scans across a curved feature that is a closed object. The data 26 is then processed in step 34 by the processor 6 to obtain four sets of Cartesian coordinates. FIG. 6 illustrates exemplary schematics of a curved feature that is a closed object with four points obtained from the respective scans. In step 36, two groups, containing three sets of Cartesian coordinates each, are selected from the four sets of Cartesian coordinates. The two groups may contain the following sets of Cartesian coordinates:

Group 1: $(x_1,y_1)$; $(x_2,y_2)$; $(x_3,y_1)$
Group 2: $(x_2,y_2)$; $(x_3,y_1)$; $(x_4,y_2)$.

As stated previously, in step 38, the groups are fitted in the equation of a circle and solved simultaneously. In this embodiment, two radius of curvature results are obtained. In steps 40 and 42, the radius of curvature data is used to determine the diameter and circularity of the curved feature, and in step 44, the results are stored in the storage device 8 and/or exported to the output device 10.

Figure 7:
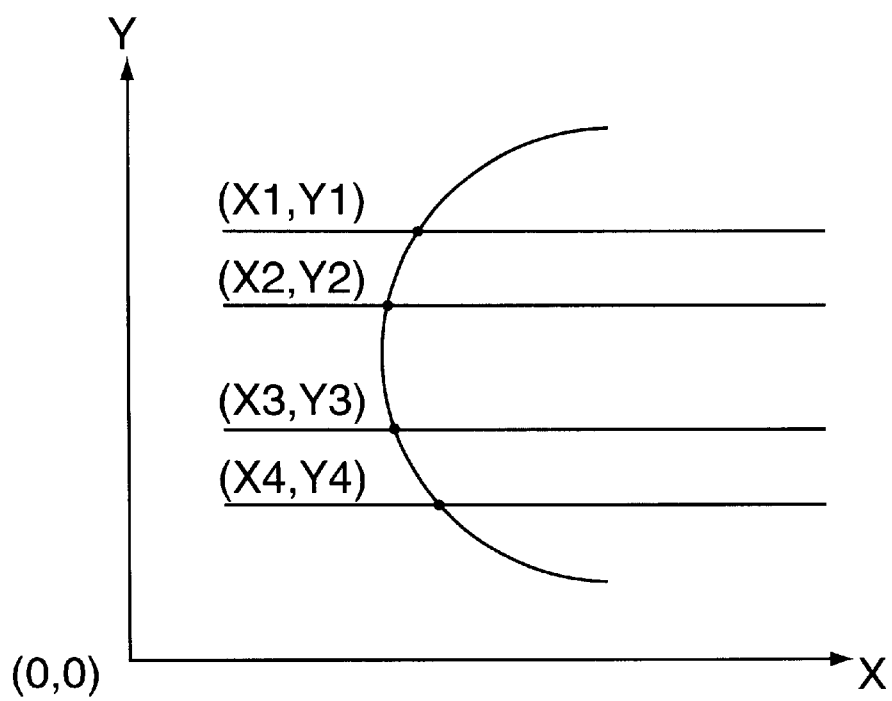
FIG. 7 is an exemplary schematic representation showing four scans across a curved feature that is non-circular, and the corresponding sets of Cartesian coordinates.

In another embodiment, step 24 performs a minimum of three incremental one-dimensional scans across a curved feature that is a open object. For example, FIG. 7 illustrates an open object with four scans. The data 26 is then processed in step 34 by the processor 6 to obtain four sets of Cartesian coordinates. In step 36, two groups, containing three sets of Cartesian coordinates each, are selected from the four sets of Cartesian coordinates. The two groups may contain the following sets of Cartesian coordinates:

Group 1: $(x_1,y_1)$; $(x_2,y_2)$; $(x_4,y_4)$
Group 2: $(x_2,y_2)$; $(x_3,y_3)$; $(x_4,y_4)$.

As stated previously, in step 38, the groups are fitted in the equation of a circle and solved simultaneously. In this embodiment, two radius of curvature results are obtained. In steps 40 and 42, the radius of curvature data is used to determine the diameter and circularity of the curved feature, and in step 44, the results are stored in the storage device 8 and/or exported to the output device 10.

Other embodiments use different combinations of scans and sets of Cartesian coordinates. For example, in a further embodiment, the scanning of steps 24 and 30 is performed both vertically and horizontally. In another embodiment involving a curved feature that is closed, the feature is schematically divided into four equal slices, or quadrants. The sets of Cartesian coordinates selected in step 36 are chosen from each of the quadrants, with three sets of Cartesian coordinates from each quadrant.

Figure 8:
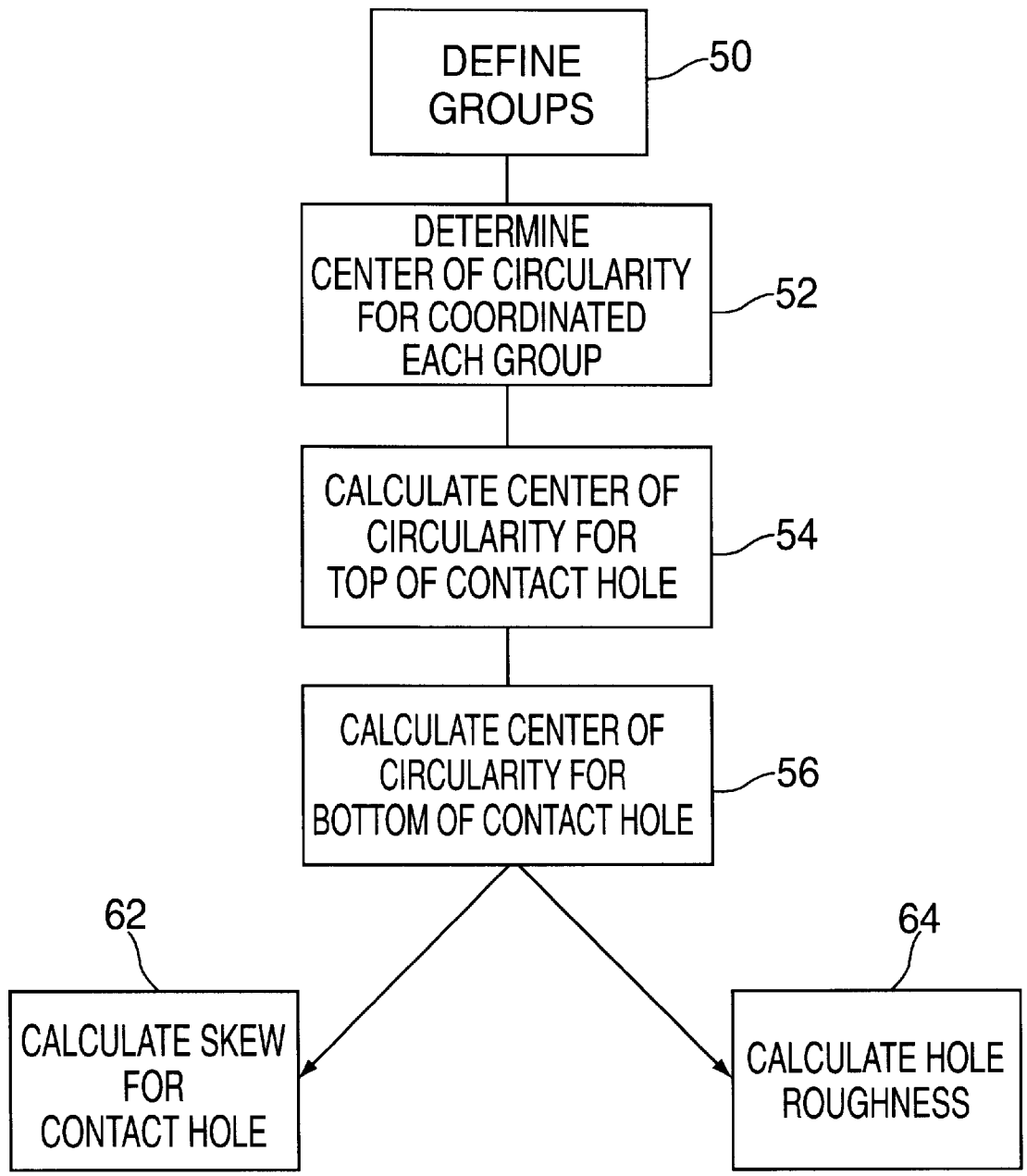
FIG. 8 illustrates an exemplary procedure for determining the center of circularity, contact hole skew, and contact hole roughness.
Figure 9:
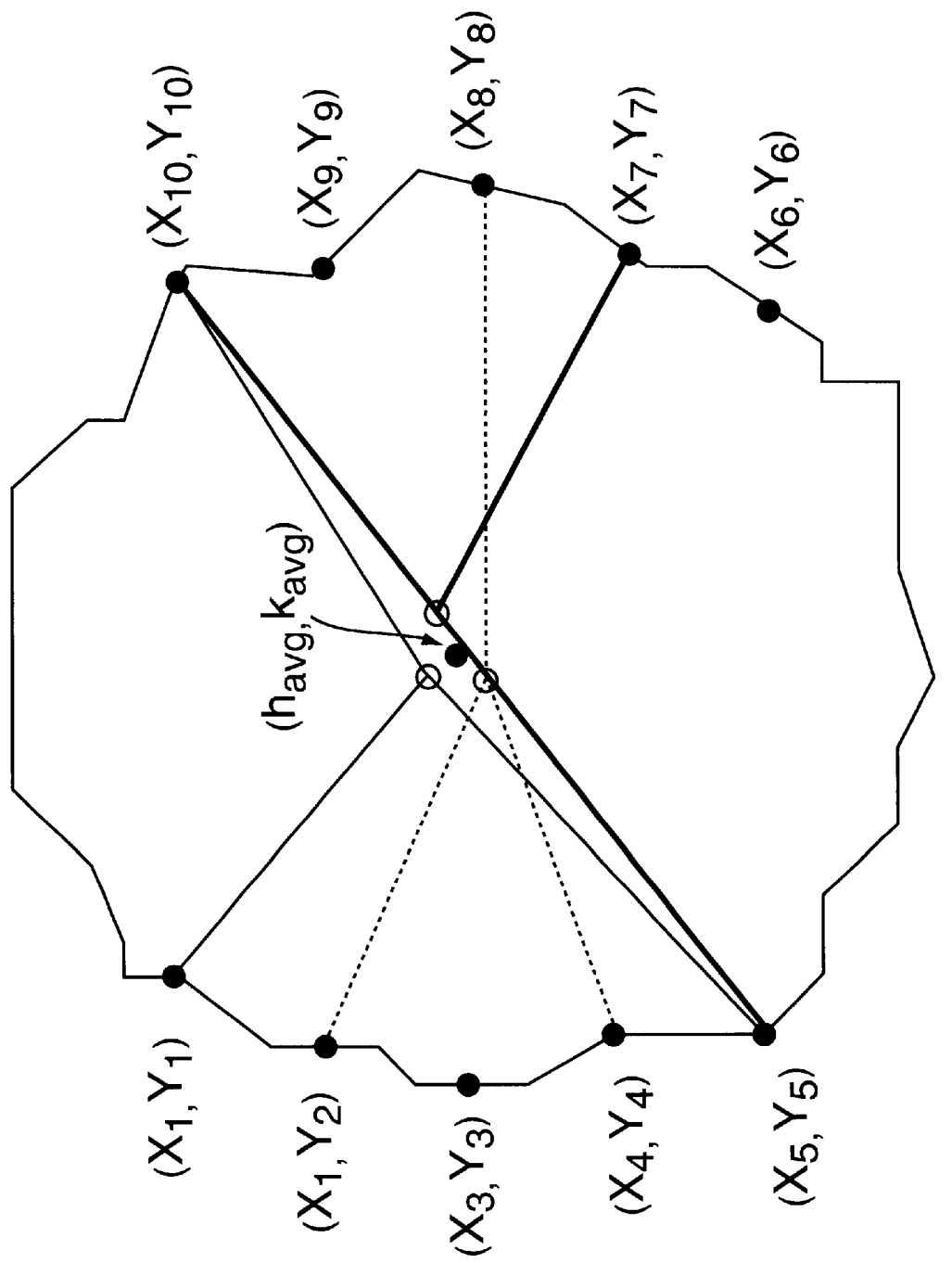
FIG. 9 is an exemplary schematic representation of a curved feature with coordinates for calculating the center of circularity.
Figure 10:
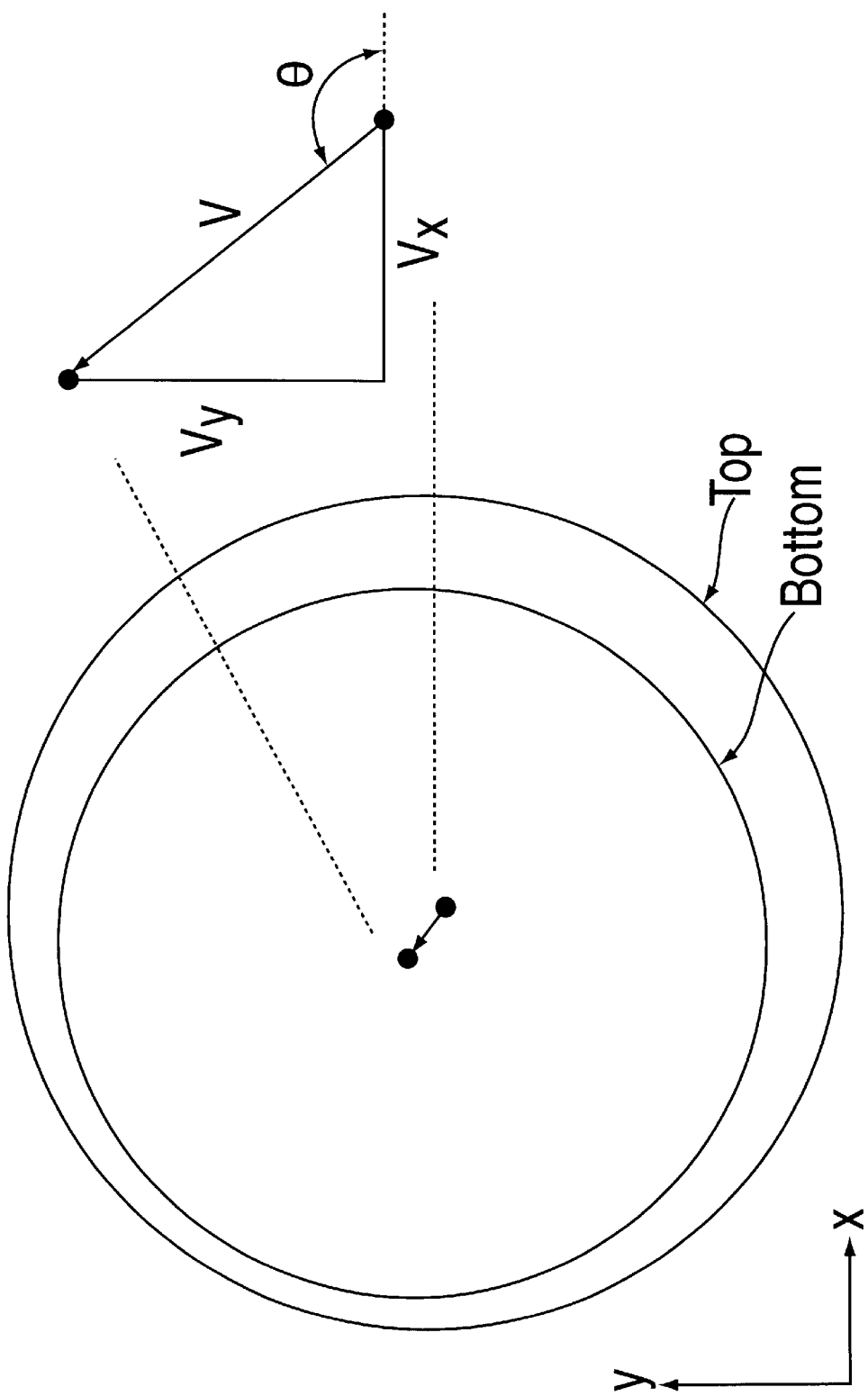
FIG. 10 is an exemplary schematic representation of a contact hole top and bottom.
Figure 11:
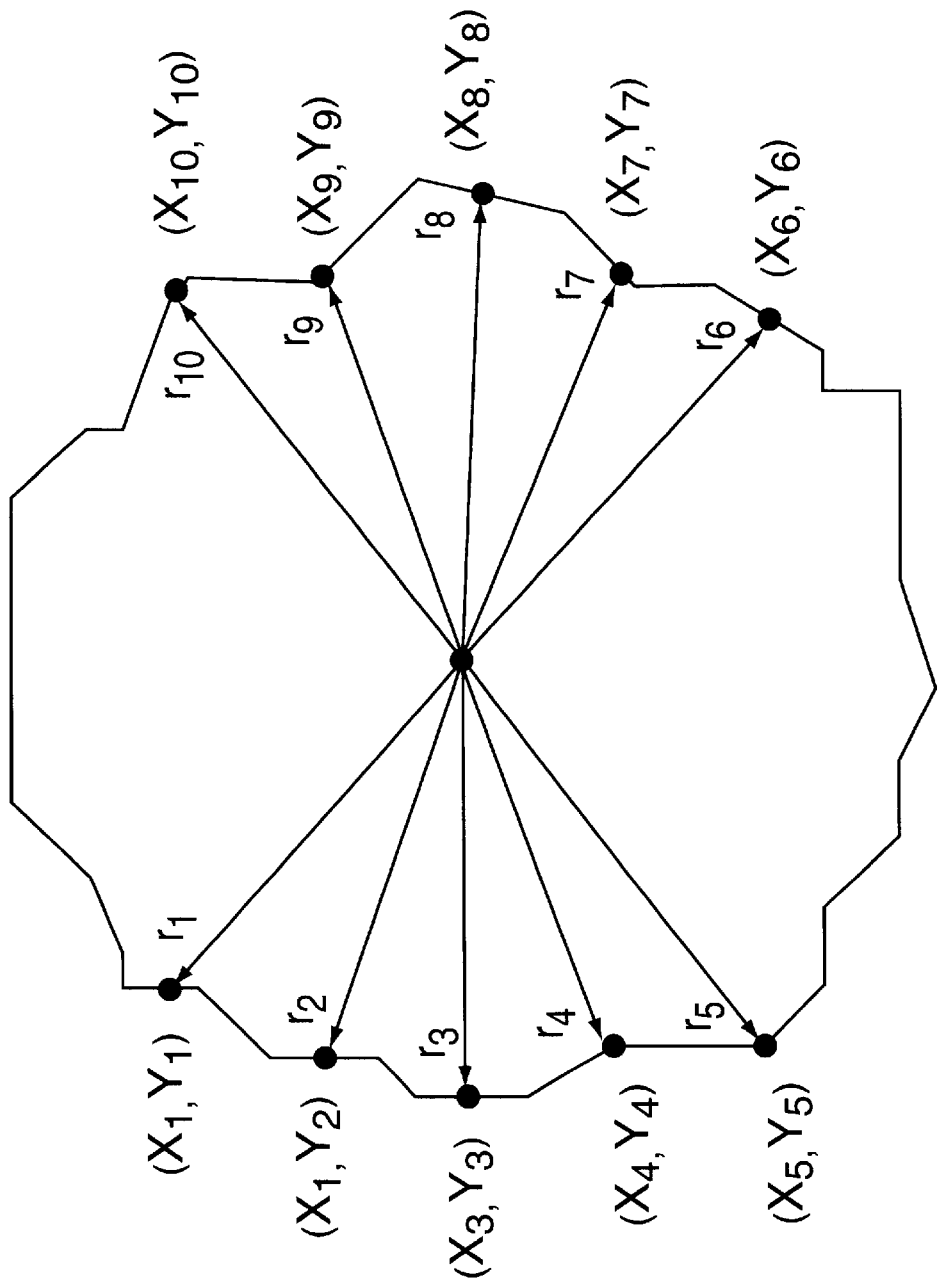
FIG. 11 is an exemplary schematic representation of a curved feature with edge roughness.

In order to calculate the center of circularity, skew and roughness for irregular shapes such as contact holes or vias in integrated circuits the exemplary procedure of FIG. 2 can be expanded. FIG. 9 and FIG. 10 and FIG. 11 illustrate how the concepts of FIG. 2 can be applied to such a structure and FIG. 8 is set of exemplary procedures for doing so. Referring to the coordinates referenced in FIG. 9, the center of circularity calculation procedure is charted in the upper half of FIG. 8. First, at step 50 define g number of groups, from c number of coordinate pairs obtained completely form either top or bottom of contact hole, taken from n number of scans. Each group $g_i$ will have at least one coordinate, c, from the opposite side of the contact. The maximum number of groups will be equal to the maximum number of possible independent combinations of three coordinate pairs from all coordinate pairs available.

$$g_{max}=cC3 \text{ where } c=2n.$$

Next at step 52 for each group, $g_i$, the center of circularity is determined as the coordinate $(h_i, k_i)$ as determined by the best fit equation for a circle comprised from the coordinates in $g_i$. The center of circularity for the top and bottom of the contact are determined in steps 54 and 56, respectively.

As shown in FIG. 10 the centers of circularity for the top and bottom holes are often skewed. The procedure described above can be applied to the determination of top and bottom contact via or hole skew. The procedure in FIG. 8 is applied to address this issue. Step 54 uses coordinate pairs determined from the "Top" of the contact hole determine the center of circularity for the "top". Step 56 uses the coordinate pairs determined from the "Bottom" of the contact hole determine the center of circularity for the "Bottom." Step 62 calculates the "contact skew." Contact skew is defined by the vector difference between the top and bottom center of circularity. This vector can be defined relative to the "top" or "bottom" of the contact. For example, V the vector difference in "top" and "bottom" centers is represented as $([h_{top}-h_{bottom}],[k_{top}-k_{bottom}])$. The vector represented in vector notation would be $V=(h_b-h_t)i+(k_b-k_t)j$. Alternately, the skew can be defined as the scalar, v with an angle of skew, $\theta$. The orientation angle of skew, $\theta$, is defined as $$\theta=\tan^{-1}[(h_b-h_t)i/(k_b-k_t)]$$

with a scalar distance of $$v=[(h_b-h_t)^2/(k_b-k_t)^2]^{1/2}$$

Therefore, the skew can either be represented as a vector, V, or as a scalar, v, with an angle $\theta$.

The center of circularity procedure can also be used in the calculation of contact hole roughness. As illustrated in FIG. 11. First, at steps 54 and 56 a center of circularity calculation is done for the top and bottom of the contact hole. Then at step 64 the hole roughness is calculated. The contact hole roughness is defined as the variance in radii as determined from the center of circularity. Where the radius, r, is the distance of a coordinate pair $(x_i,y_i)$ from the center $((h_{avg}k_{avg})$. The average contact radius is $r_{avg}$ and the roughness is the variance in deltas of all $r_i$ from $r_{avg}$.

All of the above calculations can be performed on any curved feature or one side of a curved feature open or closed. The description applying these procedures to contacts is merely illustrative. As described above, the present invention can include embodiments in the form of computer-implemented processes and apparatuses for practicing those processes. The present invention can also include embodiments in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also include embodiments in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the appended claims.

What is claimed is:

1. A system for determining a radius of curvature of a two-dimensional curved feature, the system comprising:
   an image/scan acquisition device for obtaining images of said curved feature;
   a processor coupled to said image acquisition device for receiving said images and converting said images to n sets of coordinates corresponding to points on the perimeter of said curved feature, said processor choosing at least three sets of said coordinates to define at least one group and fitting each set of said n coordinates from each said group to an equation for a circle and determining a radius of curvature by solving each equation simultaneously;
   a storage device coupled to said processor for storing processor data; and
   an output device coupled to said processor for outputting processor data.

2. The system of claim 1 wherein said processor determines said radius of curvature "R" utilizing the following formula:

$$R^2=(x-h)^2+(y-k)^2$$

where the symbols "x" and "y" correspond to a set of said coordinates and where the symbols "h" and "k" correspond to a center of curvature.

3. The system of claim 1 further comprising: said processor determining a diameter using said radius of curvature.

4. The system of claim 1 further comprising:
   said processor determining a circularity by calculating and averaging the variance in at least two radius of curvature results.

5. The system of claim 1 wherein said curved feature is closed.

6. The system of claim 1 wherein said curved feature is open.

7. The system of claim 5 wherein:
   said image acquisition device produces sixteen spaced, incremental one-dimensional scans across said curved feature; and
   said processor chooses four of said scans centered about, but not including a scan corresponding to the set of coordinates with a maximum spacial distance there between, determines eight sets of said coordinates that correspond to said four chosen scans and defines two groups corresponding to a first side of said curved feature and two groups corresponding to a second side of said curved feature.

8. The system of claim 1 wherein said processor chooses said groups from adjacent sets of said coordinates.

9. The system of claim 5 wherein said processor divides said curved feature into four quadrants and defines four groups by sets of said coordinates corresponding to each of said quadrants.

10. The system of claim 1 wherein said image acquisition device produces multiple spaced, incremental scans in two orthogonal directions.

11. The system of claim 10 wherein said processor determines an averaged radius of curvature by averaging the radius of curvature results for both said orthogonal directions.

12. A method for determining the radius of curvature of a two-dimensional curved feature, the method comprising:
   providing a target with a curved feature;
   producing multiple spaced, incremental one-dimensional scans in at least one direction across said curved feature;
   obtaining n sets of coordinates corresponding to peaks of intensities from said scans;
   choosing at least three sets of said coordinates to define at least one group;
   fitting each set of said coordinates from each said group to an equation for a circle; and
   determining a radius of curvature by solving each equation simultaneously.

13. The method of claim 12 wherein said radius of curvature "R" is determined utilizing the following formula:

$$R^2=(x-h)^2+(y-k)^2$$

where the symbols "x" and "y" correspond to a set of said coordinates and where the symbols "h" and "k" correspond to a center of curvature.

14. The method of claim 12 further comprising: determining a diameter using said radius of curvature.

15. The method of claim 12 further comprising:
   determining a circularity by calculating and averaging the variance in at least two radius of curvature results.

16. The method of claim 12 wherein said curved feature is closed.

17. The method of claim 12 wherein said curved feature is open.

18. The method of claim 16 wherein:
   sixteen spaced, incremental one-dimensional scans are produced across said curved feature;
   four of said scans are chosen centered about, but not including a scan corresponding to the set of coordinates with a maximum spacial distance therebetween;
   eight sets of said coordinates that correspond to said four chosen scans are determined; and
   two groups corresponding to a first side of said curved feature and two groups corresponding to a second side of said curved feature are defined by choosing from said sets of Cartesian coordinates corresponding to said first side and said second side of said curved feature.

19. The method of claim 12 wherein said groups are chosen from adjacent sets of said coordinates.

20. The method of claim 16 wherein:
   said curved feature is divided into four quadrants and four groups are defined by sets of said coordinates corresponding to each of said quadrants.

21. The method of claim 12 wherein said scans are produced in two orthogonal directions.

22. The method of claim 21 wherein an averaged radius of curvature is determined by averaging the radius of curvature results for both said orthogonal directions.

23. A storage medium encoded with machine-readable computer program code for determining a radius of curvature of a two-dimensional curved feature, the storage medium including instructions for causing a processor to implement a method comprising:

producing multiple spaced, incremental one-dimensional scans in at least one direction across a target with a curved feature;

obtaining n sets of coordinates corresponding to peaks of intensities from said scans;

choosing at least three sets of said coordinates to define at least one group;

fitting each set of said coordinates from each said group to an equation for a circle; and determining a radius of curvature by solving each equation simultaneously.

24. The storage medium of claim 23 wherein said radius of curvature "R" is determined utilizing the following formula:

$$R^2 = (x-h)^2 + (y-k)^2$$

where the symbols "x" and "y" correspond to a set of said coordinates and where the symbols "h" and "k" correspond to a center of curvature.

25. The storage medium of claim 23 further comprising instructions for causing the processor to implement:

determining a diameter using said radius of curvature.

26. The storage medium of claim 23 further comprising instructions for causing the processor to implement:

determining a circularity by calculating and averaging the variance in at least two radius of curvature results.

27. The storage medium of claim 23 wherein said curved feature is closed.

28. The storage medium of claim 23 wherein said curved feature is open circular.

29. The storage medium of claim 27 wherein:

sixteen spaced, incremental one-dimensional scans are produced across said curved feature;

four of said scans are chosen centered about, but not including a scan corresponding to the set of coordinates with a maximum spacial distance there between;

eight sets of said coordinates that correspond to said four chosen scans are determined; and two groups corresponding to a first side of said curved feature and two groups corresponding to a second side of said curved feature are defined by choosing from said sets of coordinates corresponding to said first side and said second side of said curved feature.

30. The storage medium of claim 23 wherein said groups are chosen from adjacent sets of said coordinates.

31. The storage medium of claim 27 wherein:

said curved feature is divided into four quadrants and four groups are defined by sets of said n coordinates corresponding to each of said quadrants.

32. The storage medium of claim 23 wherein said scans are produced in two orthogonal directions.

33. The storage medium of claim 32 wherein an averaged radius of curvature is determined by averaging the radius of curvature results for both said orthogonal directions.

34. The system of claim 1 wherein said processor processes a plurality of groups and a center is chosen by averaging the center determined from each group.

35. The system of claim 34 wherein said processor determines edge-roughness by processing the radius from the center to a plurality of points on the edge of the curved feature.

36. The system of claim 1 wherein the curved feature is a contact hole formed in an integrated circuit device and the image acquisition device obtains images from a plurality of levels in the via.

37. The system of claim 36 wherein the processor determines a center at each of the plurality of levels.

38. The method of claim 12 further comprising determining a center for the curved feature by averaging the center from each of a plurality of groups.

39. The method of claim 38 further comprising determining the edge-roughness of the curved feature by measuring the radius from the center to a plurality of points on the edge of the curved feature.

40. The method of claim 12 wherein the curved feature is a contact hole formed in an integrated circuit device and the contact hole is scanned at a plurality of levels.

41. The method of claim 40 further comprising determining the center in each level of the contact hole which is scanned.

42. The storage medium of claim 23 further comprising instructions for the processor to implement determining a center for the curved feature by averaging the center from each of a plurality of groups.

43. The storage medium of claim 42 further comprising instructions for the processor to implement determining the edge-roughness of the curved feature by measuring the radius from the center to a plurality of points on the edge of the curved feature.

44. The storage medium of claim 23 further comprising instructions for the processor to implement scanning in images from a plurality of levels in a contact hole.

45. The storage medium of claim 44 further comprising instructions for the processor to implement determining the center in each level of the contact hole in which an image is scanned.

* * * * *